United States Patent [19]

Eggleston

[11] Patent Number: 5,762,315
[45] Date of Patent: Jun. 9, 1998

[54] VALVE ACTUATOR WITH PLIABLE PRESSURE CONVERSION DEVICE

[75] Inventor: Philip Wayne Eggleston, Sherman, Tex.

[73] Assignee: Fisher Controls International, Inc., Clayton, Mo.

[21] Appl. No.: 630,529

[22] Filed: Apr. 10, 1996

[51] Int. Cl.$^6$ .................................................. F16K 31/126
[52] U.S. Cl. ......................... 251/61.4; 251/63.6; 92/117 A; 92/103 F
[58] Field of Search .............................. 251/61.4, 61.2, 251/61.1, 63.6; 92/117 A, 103 F

[56] References Cited

U.S. PATENT DOCUMENTS

| Re. 35,136 | 1/1996 | Hasegawa et al. | 92/99 |
|---|---|---|---|
| 362,767 | 5/1887 | McNair . | |
| 2,190,117 | 2/1940 | Griffith . | |
| 2,293,269 | 8/1942 | Rufus . | |
| 2,296,213 | 9/1942 | Kretzschmar | 267/1 |
| 2,305,099 | 12/1942 | Morris | 287/53 |
| 2,535,382 | 12/1950 | Bachli et al. | 287/53 |
| 2,641,280 | 6/1953 | Fleischhauer | 137/62.5 |
| 2,642,216 | 6/1953 | Carter . | |
| 2,707,966 | 5/1955 | Taplin | 137/116.5 |
| 2,722,881 | 11/1955 | Sutterfield et al. . | |
| 2,731,534 | 1/1956 | Hansen et al. . | |
| 2,870,873 | 1/1959 | Mueller | 188/33 |
| 2,878,701 | 3/1959 | Weersma | 81/71 |
| 3,011,758 | 12/1961 | McFarland, Jr. | 251/331 |
| 3,070,029 | 12/1962 | Russell | 103/150 |
| 3,082,792 | 3/1963 | Jenkins | 137/790 |
| 3,084,901 | 4/1963 | Thorburn . | |
| 3,175,472 | 3/1965 | Little | 92/94 |
| 3,195,418 | 7/1965 | Zukas | 91/416 |
| 3,224,345 | 12/1965 | Doetsch | 92/94 |
| 3,254,660 | 6/1966 | Ray | 137/66 |
| 3,275,286 | 9/1966 | Wood | 251/30 |
| 3,282,171 | 11/1966 | Tuckmantel | 92/103 F X |
| 3,434,395 | 3/1969 | Londal | 92/6 |
| 3,452,961 | 7/1969 | Forsman | 251/31 |
| 3,486,731 | 12/1969 | Magnani et al. . | |

(List continued on next page.)

FOREIGN PATENT DOCUMENTS

| A-0 192 973 | 9/1986 | European Pat. Off. . |
|---|---|---|
| 2 509 008 | 1/1983 | France . |
| 2 343 069 | 2/1975 | Germany . |
| 23 43 069 A | 2/1975 | Germany . |
| 42 44 573 | 7/1994 | Germany . |
| 56-63164 | 5/1981 | Japan . |
| 1 595 576 | 7/1969 | United Kingdom . |

OTHER PUBLICATIONS

Fisher Controls, "Type 657 and 667 Diaphragm Actuators", Bulletin 61.1:657, Apr. 1992.
Fisher Controls, "470 Series Piston Actuators", Bulletin 61.2:470, Jul. 1993.
Fisher Controls, "Type 585 and 585R Piston Actuators", Bulletin 61.2:585, Jul. 1993.
Compteurs Schlumberger, Division Controle Industriel, Technical File FT50-37/C, "Servo-Moteur Pneumatique Reversible, Type KW", pp. 1-8, Mai 1976 (Translation supplied).

*Primary Examiner*—Kevin Lee
*Attorney, Agent, or Firm*—Marshall, O'Toole, Gerstein, Murray & Borun

[57] ABSTRACT

An actuator for fluid control valves with a reversible power module having a stationary inner member and a coaxially aligned movable outer member coupled to the valve flow control element and slidably movable on the inner member. A chamber formed between respective ends of the members includes a preformed bladder. Pneumatic pressure applied to the bladder drives the movable member to actuate the valve in a first direction. A spring returns the movable member in the second direction. The preformed bladder is formed with two pieces including an interconnecting perimeter portion. During bladder actuation the bladder perimeter portion is displaced from the bladder inner diameter to the bladder outer diameter with the bladder material in tension to thereby prolong bladder life.

12 Claims, 6 Drawing Sheets

U.S. PATENT DOCUMENTS

| Patent # | Date | Inventor | Class |
|---|---|---|---|
| 3,513,059 | 5/1970 | Prohaska | 92/103 F X |
| 3,516,442 | 6/1970 | Munroe . | |
| 3,588,036 | 6/1971 | Harter . | |
| 3,610,571 | 10/1971 | Cisco . | |
| 3,717,322 | 2/1973 | Bernard . | |
| 3,719,199 | 3/1973 | Mentink . | |
| 3,719,343 | 3/1973 | Werra . | |
| 3,804,364 | 4/1974 | De Lepeleire . | |
| 3,814,119 | 6/1974 | Bertrand et al. . | |
| 3,817,452 | 6/1974 | Dean, Jr. . | |
| 3,845,783 | 11/1974 | De Lepeleire . | |
| 3,945,565 | 3/1976 | Lynch et al. . | |
| 3,958,592 | 5/1976 | Wells et al. . | |
| 3,963,377 | 6/1976 | Elliot et al. . | |
| 3,978,922 | 9/1976 | Johnson et al. . | |
| 3,980,135 | 9/1976 | Garrett . | |
| 3,982,558 | 9/1976 | Ochs | 251/61.2 X |
| 4,003,547 | 1/1977 | Snyder et al. | 251/31 |
| 4,014,386 | 3/1977 | Johnson et al. . | |
| 4,017,025 | 4/1977 | Dravnieks et al. . | |
| 4,027,692 | 6/1977 | Bouteille et al. . | |
| 4,111,221 | 9/1978 | Olsen . | |
| 4,111,608 | 9/1978 | Elliott et al. . | |
| 4,147,094 | 4/1979 | Iguchi | 92/48 |
| 4,151,819 | 5/1979 | Inada et al. . | |
| 4,178,938 | 12/1979 | Au . | |
| 4,187,764 | 2/1980 | Cho | 91/442 |
| 4,225,110 | 9/1980 | Akkerman et al. | 251/58 |
| 4,240,335 | 12/1980 | Stucka et al. | 92/96 |
| 4,261,546 | 4/1981 | Cory et al. | 251/58 |
| 4,278,108 | 7/1981 | Casacci | 137/613 |
| 4,295,630 | 10/1981 | Card et al. | 251/14 |
| 4,309,022 | 1/1982 | Reinicke et al. | 251/61.4 |
| 4,340,079 | 7/1982 | Smith et al. . | |
| 4,364,414 | 12/1982 | Bouteille et al. . | |
| 4,434,707 | 3/1984 | Takeuchi et al. | 91/376 R |
| 4,441,519 | 4/1984 | Terral . | |
| 4,480,811 | 11/1984 | Card et al. | 251/14 |
| 4,527,769 | 7/1985 | Stogner et al. | 251/14 |
| 4,545,433 | 10/1985 | Wambaugh . | |
| 4,546,953 | 10/1985 | Vinoiguerra et al. | 251/58 |
| 4,569,378 | 2/1986 | Bergandy . | |
| 4,572,237 | 2/1986 | Thompson . | |
| 4,582,082 | 4/1986 | Tosseghini . | |
| 4,604,944 | 8/1986 | Tsubouchi | 92/98 D |
| 4,732,189 | 3/1988 | Jones et al. . | |
| 4,783,046 | 11/1988 | Young et al. . | |
| 4,787,413 | 11/1988 | Saggers . | |
| 4,809,733 | 3/1989 | Hawkins . | |
| 4,877,058 | 10/1989 | Stoll . | |
| 4,889,153 | 12/1989 | Zepernick et al. . | |
| 4,925,498 | 5/1990 | Kemmler . | |
| 4,930,555 | 6/1990 | Rudick . | |
| 4,977,922 | 12/1990 | McWilliams . | |
| 4,986,299 | 1/1991 | Schultz . | |
| 5,007,330 | 4/1991 | Scobie et al. | 92/120 |
| 5,016,856 | 5/1991 | Tartaglino . | |
| 5,029,806 | 7/1991 | Huo-Lien et al. | 251/61.4 X |
| 5,069,248 | 12/1991 | Gill . | |
| 5,086,801 | 2/1992 | Peacock et al. | 137/12 |
| 5,101,853 | 4/1992 | Mailliet et al. | 137/242 |
| 5,275,014 | 1/1994 | Solomon . | |
| 5,277,397 | 1/1994 | Tartaglino . | |
| 5,305,987 | 4/1994 | Baumann | 251/298 |
| 5,337,797 | 8/1994 | Janssen et al. . | |
| 5,348,270 | 9/1994 | Dinh . | |
| 5,357,999 | 10/1994 | Loth et al. . | |
| 5,370,147 | 12/1994 | Brusse et al. . | |
| 5,487,527 | 1/1996 | Eggleston . | |
| 5,507,467 | 4/1996 | Mott | 251/58 |

VALVE ACTUATOR WITH PLIABLE PRESSURE CONVERSION DEVICE

This invention generally relates to fluid flow control devices and in particular to actuators for fluid flow valves.

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as a pneumatic piston or diaphragm actuator responding to the output of a valve positioner or valve controller instrument for accurate throttling control of the valve.

For example, typically the fluid control valve is mounted in the pipeline system with a pneumatic actuator mounted on top of a fluid control valve and coupled to the valve fluid control element, such as a sliding stem or rotary shaft. If utilized, a valve positioner or valve controller instrument is mounted to the side of or above the actuator utilizing suitable mounting brackets and pneumatic tubing is provided between the pneumatic output of the positioner and the pneumatic input of the valve actuator. Thus, the overall valve, actuator and positioner assembly can be a fairly large and heavy combination of elements extending for some distance above the valve and projecting therefor above and to the side of the pipeline and possibly greatly beyond the valve itself.

With reference to my U.S. Pat. No. 5,487,527, "Valve Actuator", assigned to the same assignee as herein, there is provided a valve actuator for fluid control valves with a reversible power module having a stationery inner member and a coaxial aligned movable outer member coupled to a valve flow control element and slidably movable on the inner member. A chamber is formed between respective ends of the inner and outer members. Pneumatic pressure applied to the chamber drives the movable member to actuate the valve in a first direction and a spring returns the movable member in a second direction. In one embodiment, a balloon-type bladder is inserted in the chamber formed between respective ends of the members so that upon the coupling of suitable fluid pressure to the bladder inlet, the movable outer member will be moved by the expanding bladder trapped between the fixed inner member and the movable outer member.

While the bladder embodiment shown in my aforementioned patent performed satisfactorily at ambient temperatures, the unit was found not to perform satisfactorily under a variety of temperatures. In addition, it is desired to provide the valve actuator with a bladder device which exhibits commercially acceptable reliability characteristics, particularly over extended operating cycles and wide temperature and pressure ranges.

SUMMARY OF THE INVENTION

In accordance with the principles of the present invention, there is provided an actuator which includes a bladder-type device which is preformed into the shape of a defined chamber between a fixed inner actuator member and a movable outer actuator member in the smallest defined chamber configuration. It has been found that in order to provide the most reliable bladder operation over a variety of temperature conditions and to decrease bladder wear, the bladder also must be preformed in the natural state to the smallest chamber size between the actuator members, so that the bladder material at the inside diameter will move to the outside diameter as the actuator is operated. This tends to always maintain the bladder material under tension so that the bladder perimeter will roll outwardly as the bladder is expanding within the chamber, in a rolling diaphragm action thereby reducing bladder wear.

It also has been found that to enhance the life and therefore the reliability of the bladder, after the bladder is formed, it must be stress relieved. Stress relieving of the bladder is obtained by baking the preformed bladder in an oven at about 250° F. for about 24 hours. It is believed that such stress relieving rearranges the molecular structure of the bladder material and thereby enhances the bladder life at cold temperature.

It is preferred to form the bladder material of polyurethane in a two-piece heat sealed structure. It further has been found to be desirable to provide a cloth reinforcing layer, such as a cloth backing on the polyurethane. At elevated high operating temperatures a thermopolyester plastic material such as Riteflex has been found useful for the bladder.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
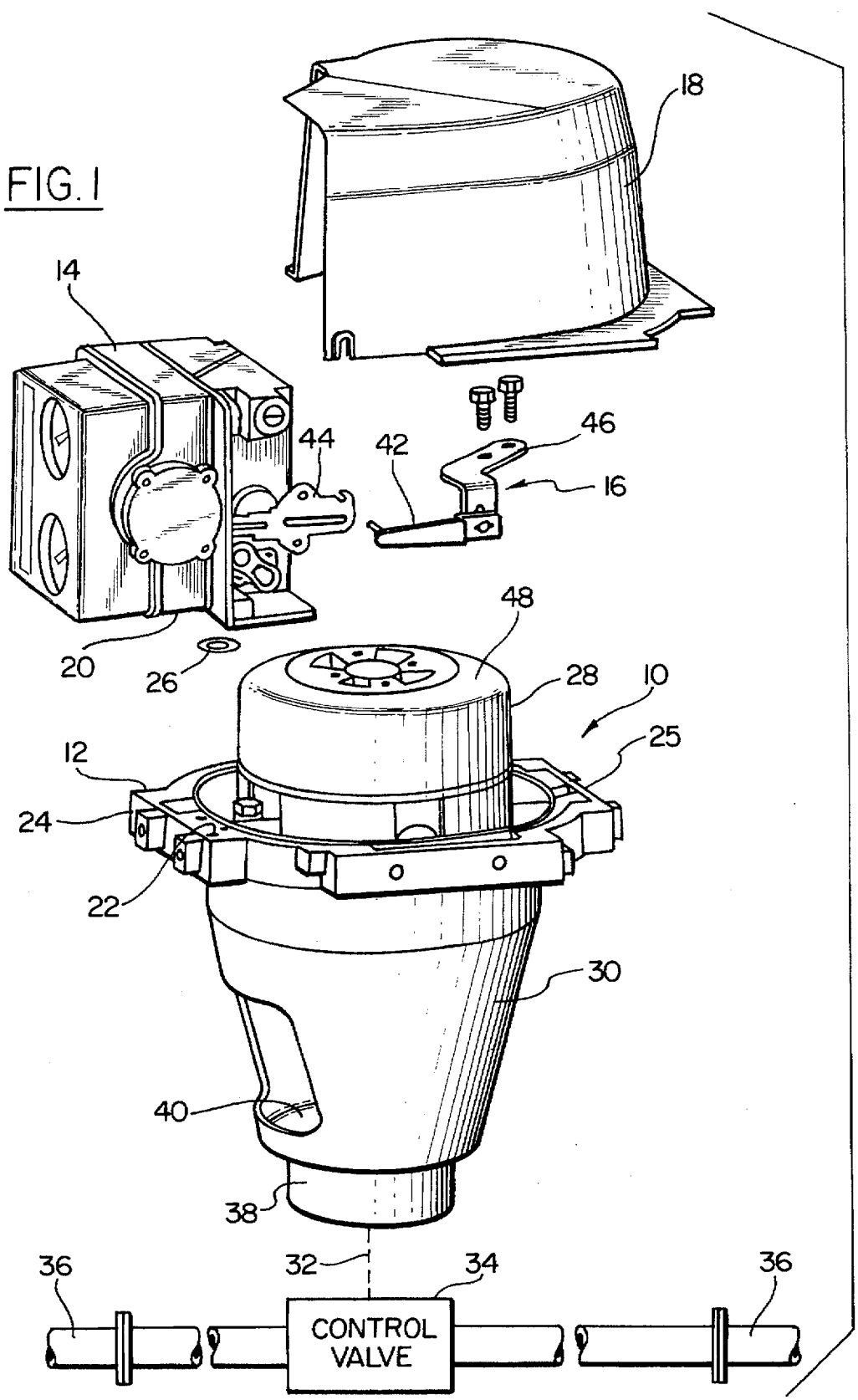
FIG. 1 is an exploded perspective view illustrating a valve actuator, a valve positioning instrument, a feedback linkage mechanism, and a cover with respect to a valve actuator and control valve positioning instrument combination in accordance with the principles of the present invention.
Figure 2:
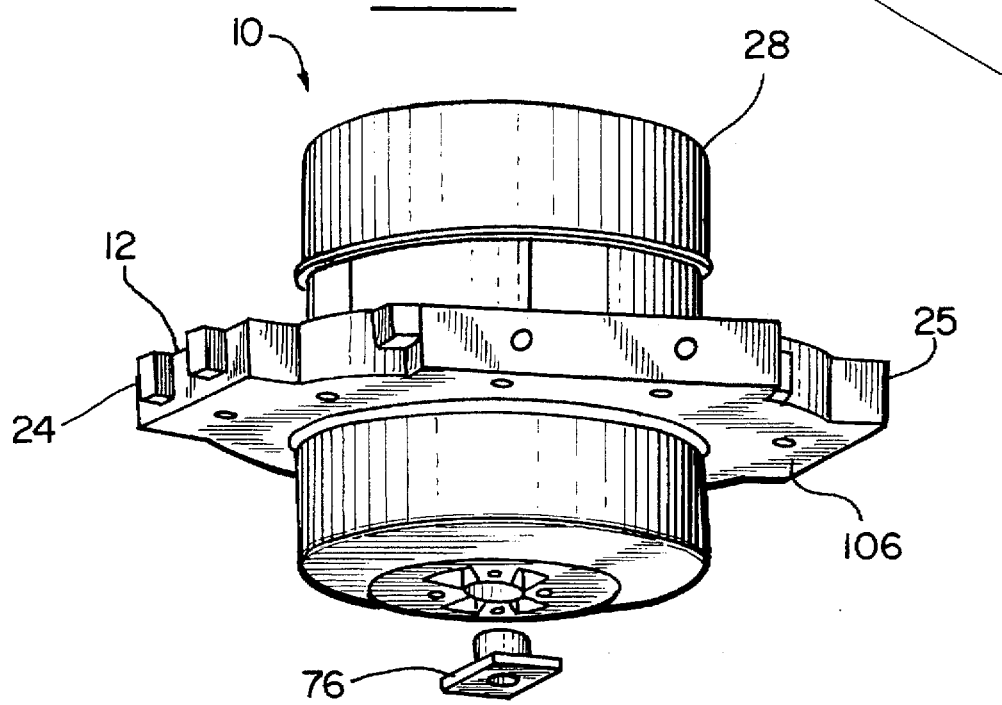
FIG. 2 is an exploded view illustrating the actuator of the present invention with a reversible power module and yoke components.
Figure 2:
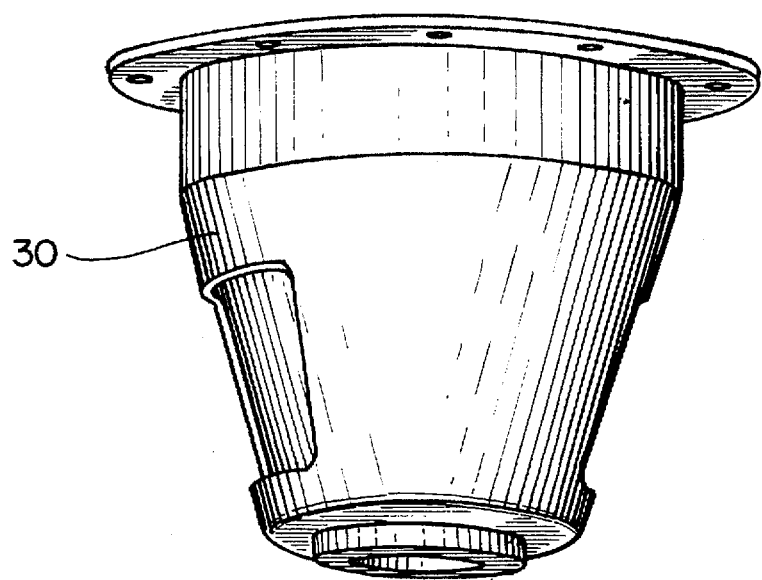

Referring initially to FIGS. 1 and 2, the present invention will be described with respect to a valve actuator 10 which includes a mounting pad 12 in the form of a ring for mounting of a valve positioner instrument 14. A feedback linkage mechanism 16 interconnects the actuator 10 and the valve positioner instrument 14. A cover 18 is provided for removable mounting on the actuator 10 so that the cover 18 preferably completely covers the feedback linkage 16.

A pneumatic output port 20 on the valve positioner 14 is mounted in line with an input port 22 on the mounting pad 12 at an instrument mounting position 24 with an o-ring 26 therebetween. The positioner 14 is then securely mounted on the mounting pad 12 at the mounting position 24 by suitable threaded means such as a pair of cap screws (not shown).

The actuator 10 includes a power module assembly 28 which is mounted by threaded screws (not shown) to a yoke 30. The valve actuator 10 is illustrated as coupled to a mechanical control element such as stem 32 for controlling for instance a fluid control valve 34, such as a sliding stem valve mounted in a pipeline 36. The combined actuator and instrument mounts to a valve bonnet 38 of the control valve 34, with the actuator yoke 30 held in place by a suitable lock nut threadably engaged on the bonnet 38 and threaded until locking against a yoke bottom flange 40.

The valve positioning instrument 14 can be a digital valve controller, such as a communicating, microprocessor-based current to pneumatic instrument. In addition to the normal function of converting an input current signal to a pneumatic output pressure, the digital valve controller, using a communications protocol, can provide easy access to information critical to process operation. Thus, one can gain information from the principle component of the process, i.e. the control valve 34, using a compatible communicating device at the control valve or at a field junction box, or by using a personal computer or operator's console within a control room. Alternatively, the instrument can be an analog device or a pneumatic positioner.

The feedback linkage 16 includes one end 42 engaging a pivoting bracket 44 on the positioner 14, whereas another feedback linkage end 46 is securely mounted to an actuator movable member 48. Because the actuator movable member 48 is interconnected with the valve stem or control element 32, the position of the valve stem is sensed by the positioner 14 through the feedback linkage mechanism 16.

Referring also now to FIGS. 3–8, there is illustrated the further details of a valve actuator having a preformed bladder in accordance with the present invention to provide reliable valve actuator operation over extended temperature and fluid pressure conditions. The power module 28 includes a stationary inner member 50 with lateral extensions 52, 54 integrally formed with the ring-shaped mounting pad 12, which mounting pad includes respective instrument mounting positions 24, 25. The mounting pad 12 is assembled on a mounting flange 56 of the yoke 30 by means of a series of suitable cap screws 57.

Figure 3:
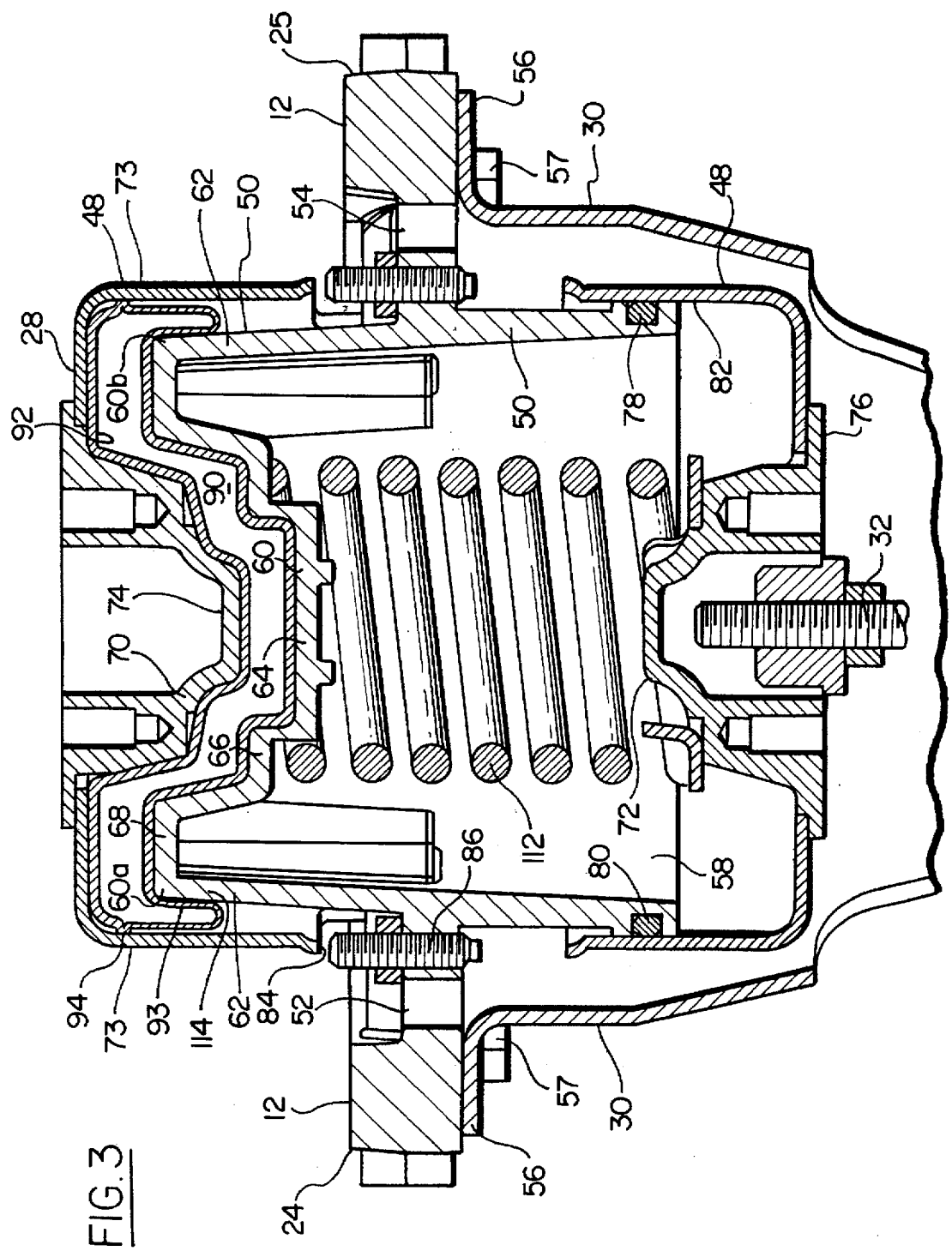
FIG. 3 is an elevational view partly in section illustrating the actuator of FIG. 1 including a bladder-type device with an actuator movable outer member being spring-driven movably downwardly with respect to a stationery inner member.

The stationary inner member 50 of the power module 28 is in the form of a stationary piston with an opened bottom end 58 as shown in FIG. 3 and an opposite closed top end provided by an end wall 60. The end wall 60 of the stationary inner member 50 extends between opposite points on a cylindrical-shaped perimeter side wall 62, i.e., the end wall 60 extends from reference points 60a to 60b as shown in FIG. 3. As shown in FIG. 3, the end wall 60 is step-shaped in cross-section, having three substantially parallel, horizontal end wall portions 64, 66, 68 joined by respective connecting slanting or vertical end wall portions.

The power module 28 also includes the movable outer member 48 in the form of a cylindrical canister axially aligned with and surrounding the stationary inner member 50. The movable outer member 48 includes opposite cavity/dome-shaped caps 70, 72 with the top cap 70 forming a dome-shaped end wall 74 which substantially matches the shape of the end wall 60 of the stationary inner member 50. The outer member 48 also includes a cylindrical side wall 73 adjacent and surrounding the inner member side wall 62 to define an annular perimeter space 75 therebetween. A stem connector plate 76 is welded to the bottom cap 72 and includes a central aperture for receiving the valve stem 32.

A guide ring 78 is mounted within an annular cavity 80 within the outer surface at the bottom end 58 of the stationary inner member 50 so as to be in sliding engagement against an inner surface 82 of the movable outer member 48. As shown most clearly in FIG. 8, the guide ring 78 includes a flat sliding surface 83 for slidably engaging the inner surface 82 of the outer member. The guide ring 78 is preferably formed of an elastomeric resin for low sliding friction, such as Delron. The purpose of the guide ring 78 is to enable guided movement of the movable outer member 48 with respect to the stationary inner member 50 and between the two extreme positions shown in FIGS. 3 and 4. In FIG. 3 it may be seen that the movable outer member 48 is substantially in the lower-most down position where a ledge 84 butts against a threaded stop 86. In contrast, in FIG. 4, the movable outer member 48 has been actuated and slidable moved upwardly under the guidable engagement of the guide ring 78 until a ledge 88 engages the threaded stop 86.

Within a chamber 90 defined between the stationary inner member end wall 60 and the movable outer member end wall 74, there is provided a sealed, preformed bladder 92 formed of two pieces joined by heat sealing at a joint 94. Bladder top-piece 92a is preformed to the shape of dome-shaped top end wall 74, and bladder bottom-piece 92b is preformed to the shape of the step-shaped bottom end wall 60. The bladder is formed of polyurethane with a cloth backing layer 95. For lower temperature usage the cloth backing layer 95 is not required. The cloth backing layer 95 surrounds the entire bladder 92 and serves to reinforce the bladder material for use at high operating temperatures. At extreme upper temperatures, a thermopolyester plastic material such as Riteflex may be used for the bladder, with or without a cloth reinforcing layer.

The bladder 92 is preferably preformed in the natural state to the smallest chamber size between the actuator members as shown in FIG. 3. Note from FIG. 3 that a bladder annular perimeter portion 93 is formed so as to extend within the annular perimeter space 75 and between the joint 94 and the reference points 60a, 60b. The cloth reinforcing layer 95 can be placed on the exterior surfaces of the bladder 92 by insertion during injection mold forming of the bladder. Alternatively, after injection molding of the bladder, the cloth can be applied thereto by suitable pressure and temperature conditions. A urethane layer can be used on a bias cut cloth prior to heat bonding to the bladder at a temperature of about 330° F. (166° C.) at 50 psi (345 Kpa) for about 1–½ hours. Instead of applying the cloth layer 95 on the entire bladder exterior, the cloth may be applied only to the annular perimeter portion 93 (see FIG. 7).

The cloth reinforced, preformed bladder is then baked in an oven to stress relieve the material. It has been found that such stress relieving of the bladder 92 in an oven can be accomplished at about 250° F. (121° C.) for about 24 hours.

To keep the bladder in place during actuator operation, upon assembly into the actuator, bonding adhesive beads may be applied above and below the joint 94 at the actuator movable member 48. Similarly the bladder can be bonded with a suitable adhesive to the top of the end wall 60.

Figure 7:
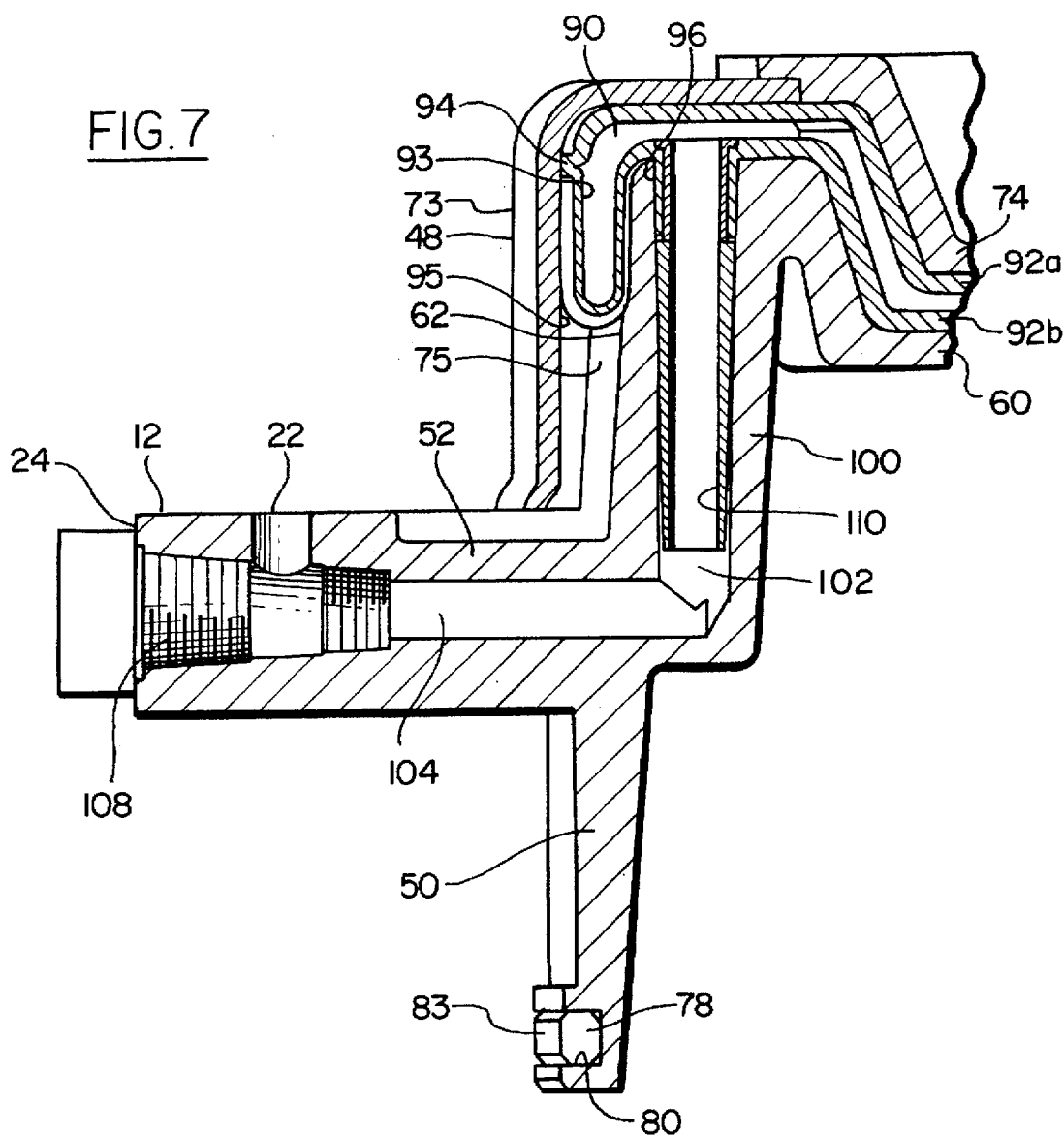
FIG. 7 is a fragmented sectional view illustrating a bladder inlet coupled to an actuator fluid inlet port.
Figure 8:
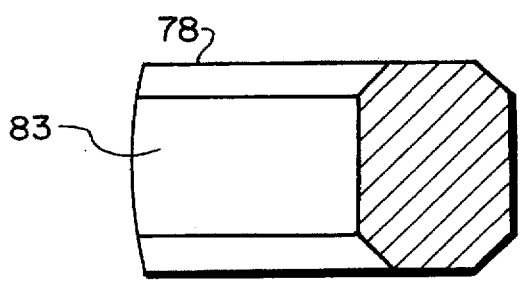
FIG. 8 is a fragmented sectional view illustrating a guide ring utilized for slidable guiding engagement between the stationary inner member and the movable outer member.

The bladder 92 includes two respective inlets 96, 98. The stationary inner member 50 includes an inner member wall 100 which includes a passageway 102 which communicates with the input port 22, at the mounting pad 12 through a connecting passageway 104 in the lateral extension 52. Similar manifold passageways through the actuator are provided on opposite sides of the power module 28 and through the lateral extension 54 leading to an input port 106 at the instrument mounting position 25 (See FIG. 2). FIG. 7 illustrates a large plug 108 inserted into passageway 104 when the instrument 14 is mounted at the mounting position 24. In such a configuration, a small plug (not shown) would be inserted into a passageway (similar to passageway 104) in the lateral extension 54 so as to prevent fluid escaping from that passageway through the input port at the unused instrument mounting position 25.

As shown in FIG. 7, the bladder inlet 96 is coupled to the passageway 102 using an extended pilot tube 110. This permits fluid communication between the pneumatic output port 20 of the valve controller instrument 14 coupled to the input port 22 and through passageways 104, 102 to enter the chamber 90 defined within the bladder 92. In a similar manner, the bladder inlet 98 is coupled to the inlet port 106 on the opposite instrument mounting position 25 through corresponding passageways in similar inner member walls and lateral extensions as shown for the instrument mounting position 24 in FIG. 7.

A spring 112 is mounted within the stationary inner member and the respective end walls of the actuator members, i.e. between the top end wall 60 of the stationary inner member and the bottom dome-shaped cap 72 of the movable outer member. Accordingly, FIG. 3 shows a normal unoperated actuator position wherein the spring 112 moves the outer member 48 to a bottom position, and FIG. 4 shows the valve actuator being operated to move the outer member 48 to the top position thereby compressing spring 112.

In the operation of the actuator 10, fluid under pressure, such as pneumatic pressure supplied by the valve controller instrument 14 to input port 20 is coupled to passageways 104, 102 and through bladder inlet 96 into chamber 90 within the bladder 92 which expands the bladder in a rolling diaphragm action which forces the movable outer member 48 to move upwardly in FIG. 3 so as to carry with it the attached mechanical control element 32 which could be a valve stem or motion conversion linkage if used with a rotary shaft valve. In any event, the driven movement of movable outer member 48 compresses the spring 112 so that the movable outer member has been moved in an upward direction, with respect to the stationary inner member 50 to the position shown in FIG. 4. In a single acting configuration, the input port at instrument mounting position 25 would be closed with suitable plugs. Relieving the pressure within the bladder 90 through the action of the valve controller instrument 14 allows the compressed spring 112 to push the movable outer member 48 downwardly in the configuration shown in FIG. 4.

In accordance with the present invention, the bladder 92 enables a rolling diaphragm action at the bladder perimeter portion 93 instead of an undesired balloon-type action during expansion of the bladder. This can be seen with reference to FIGS. 3 and 4 wherein the bladder perimeter portion 93 contact with the inner member 50—as shown in the deflated bladder condition of FIG. 3, extends from about reference point 60a to reference point 114 along the side wall 62 of the stationary inner member. As the valve actuator is operated by coupling fluid into the bladder chamber 90, the bladder perimeter portion 93 in contact with the side wall 62, merely rolls off of engagement with the side wall 62 of the stationary inner member while simultaneously increasingly engaging the side wall 73 of the movable outer member 48 as shown in FIG. 4.

Figure 4:
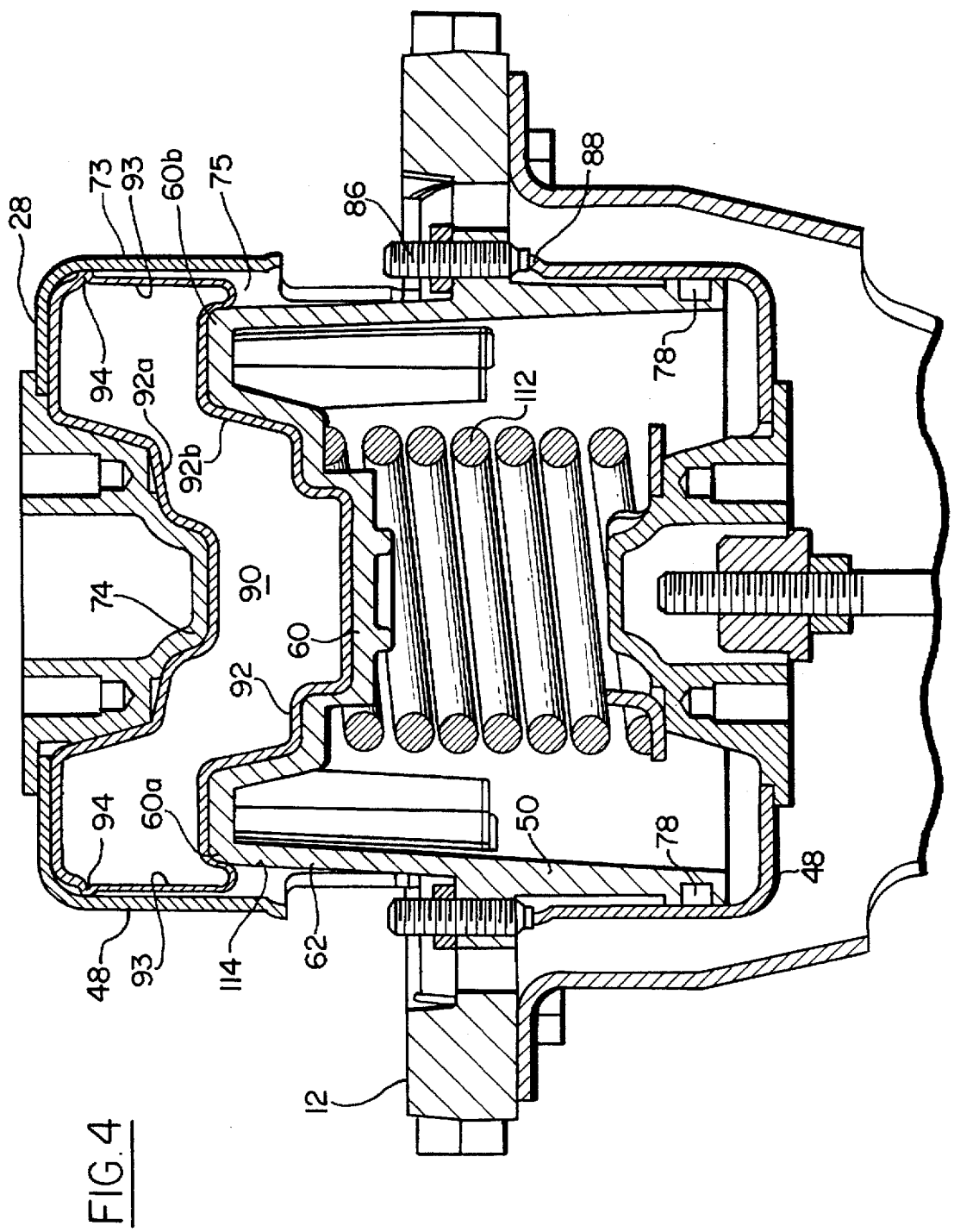
FIG. 4 is an elevational view partly in section illustrating the valve actuator of FIG. 1 with the actuator movable outer member being movably driven upwardly with respect to a stationary member.
Figure 5:
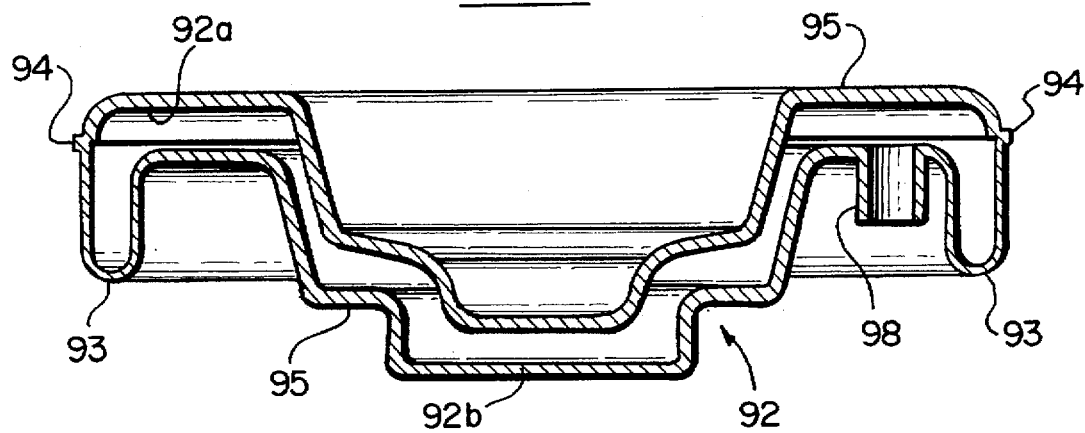
FIG. 5 is a sectional view taken along section line 5—5 of FIG. 6 illustrating a preformed bladder for location between the movable outer member and the stationary inner member.
Figure 6:
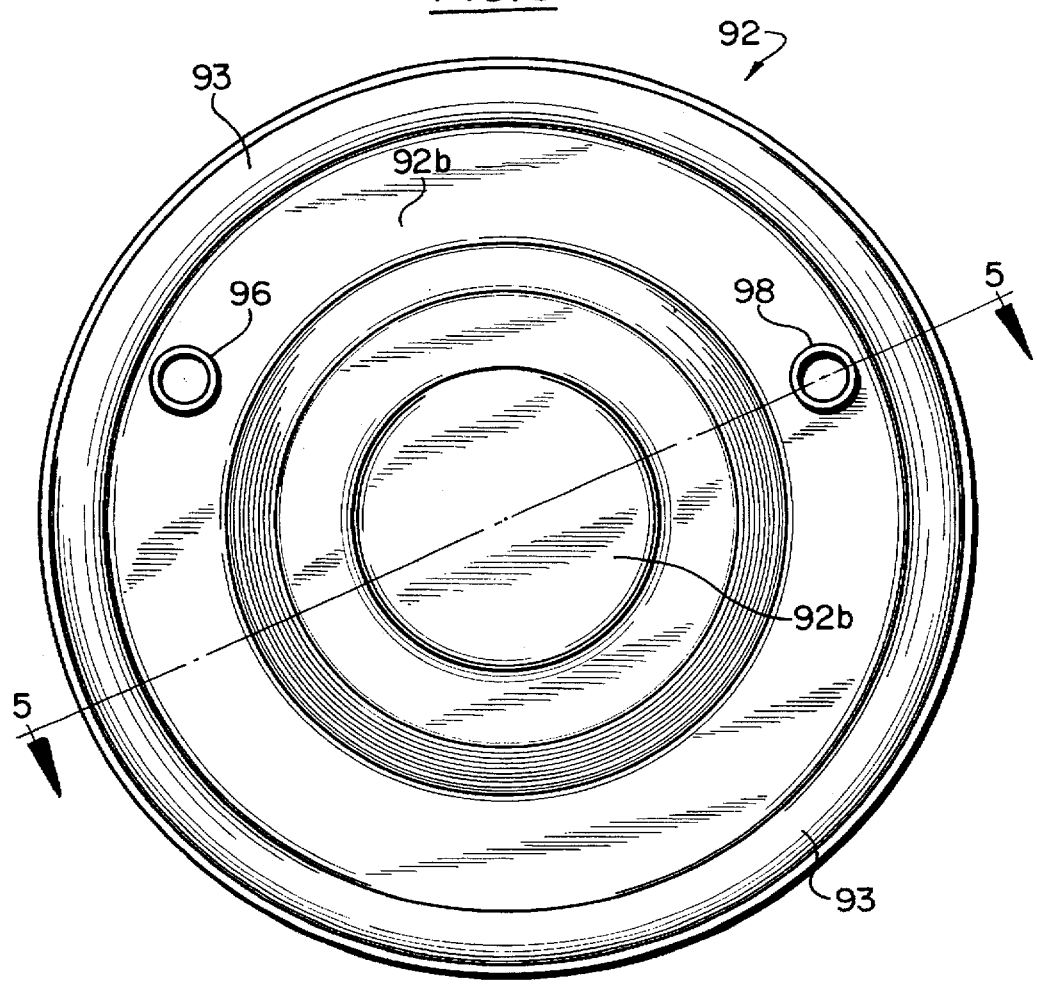
FIG. 6 is a plan view of the bladder of FIG. 5 illustrating the two bladder inlets.

Thus, in accordance with the present invention, the bladder perimeter portion 93 is expanding in going from FIG. 3 to FIG. 4, with the bladder perimeter portion merely moving from the inside diameter of the bladder to the outside diameter of the bladder in a rolling fashion placing the bladder material under tension. This significantly reduces bladder wear, increases the bladder life and enables repeated actuator operation over extended operating cycles and wide temperature and pressure ranges.

The present invention also provides the ability to utilize the valve actuator 10 in either a fail-closed or a fail-opened condition of the valve—which condition will be decided upon in the event there is a loss of actuator operating pressure. In this aspect of the invention, the power module assembly 28 is reversible after disassembly from the yoke 30 as shown in FIG. 2.

The foregoing detailed description has been given for clearness of understanding only, and no unnecessary limitations should be understood therefrom, as modifications will be obvious to those skilled in the art.

It is claimed:

1. In an actuator for operating a control element used to regulate the flow of fluid through a fluid control valve in response to a control valve positioning instrument, said actuator including a pair of coaxially aligned members comprising a movable external member externally mounted with respect to a fixed internal member and axially movable with respect to the fixed internal member, said members having adjacent ends, a chamber being defined between said adjacent ends for moving said one movable external member away from said fixed internal member during operation of said actuator, means for coupling said control element to said movable external member, and wherein said chamber when subjected to fluid under pressure operates said actuator and moves said movable external member away from said fixed internal member from a first valve actuator position to a second valve actuator position, the improvement comprising:

a preformed bladder having respective opposite bladder ends and a bladder perimeter portion joining the bladder ends, said preformed bladder inserted in said chamber defined between adjacent ends of said movable exterior member and said fixed internal member with the respective opposite bladder ends contacting said respective adjacent ends of said members and the bladder perimeter portion intermediate to and contacting said members, said preformed bladder having an initial unextended configuration matching the shape of said chamber when the respective adjacent ends are in their closest relative positions to each other, said preformed bladder having a second extended configuration matching the shape of said chamber when the respective adjacent ends are in their furthest relative positions to each other, and said preformed bladder responsive to said fluid under pressure to extend from said initial to said second configuration with said bladder perimeter portion decreasingly contacting said fixed internal member while simultaneously increasingly contacting said movable external member.

2. An actuator for a fluid control valve according to claim 1, wherein said movable external member and said fixed internal member have respective side walls adjacent each other and define a perimeter space therebetween, and said bladder perimeter portion is adapted for insertion within said perimeter space.

3. An actuator for a fluid control valve according to claim 2, wherein in said initial unextended configuration, a first bladder perimeter portion lies adjacent the internal member side wall, and wherein in moving to the extended bladder configuration said first bladder perimeter portion is rollingly removed from adjacency to the internal member side wall and rollingly located adjacent the external member side wall with the bladder maintained in tension.

4. An actuator for a fluid control valve according to claim 1, including a cloth reinforcing layer on said preformed bladder.

5. An actuator for a fluid control valve according to claim 1, wherein said preformed bladder is formed of polyurethane material.

6. An actuator for a fluid control valve according to claim 5, wherein said preformed bladder includes a cloth reinforcing layer on said polyurethane material.

7. An actuator for a fluid control valve according to claim 1, including a guide ring mounted between said internal member side wall and said external member side wall for slidably guiding said axial movement of said external member with respect to said internal member.

8. An actuator for a fluid control valve according to claim 7, wherein said guide ring is formed of an elastomeric resin having low friction characteristics.

9. An actuator for a fluid control valve according to claim 1, wherein said preformed bladder is formed of thermopolyester plastic material.

10. An actuator for a fluid control valve according to claim 9, wherein said preformed bladder includes a cloth reinforcing layer on said thermopolyester plastic material.

11. An actuator for fluid control valve according to claim 7, wherein said preformed bladder is formed of polyurethane material.

12. An actuator for a fluid control valve according to claim 7, wherein said preformed bladder is formed of thermopolyester plastic material.

* * * * *